United States Patent [19]

Edwards

[11] Patent Number: 4,493,000
[45] Date of Patent: Jan. 8, 1985

[54] POWER ON/OFF PROTECT CIRCUIT

[75] Inventor: Michael W. Edwards, Oklahoma City, Okla.

[73] Assignee: Magnetic Peripherals Incorporated, Minneapolis, Minn.

[21] Appl. No.: 537,907

[22] Filed: Sep. 30, 1983

[51] Int. Cl.³ ............................................. H02H 3/24
[52] U.S. Cl. ........................................ 361/92; 361/86; 361/90; 307/200 A
[58] Field of Search ................... 361/92, 90, 88, 86; 307/200 A; 323/313, 312, 901

[56] References Cited

U.S. PATENT DOCUMENTS

| | | | |
|---|---|---|---|
| 3,522,521 | 8/1970 | Lloyd | 323/313 |
| 3,774,109 | 11/1973 | Janycky | 361/92 X |
| 4,228,475 | 10/1983 | Sherwood | 361/47 |
| 4,232,236 | 11/1980 | Yomogida et al. | 307/200 A |
| 4,365,295 | 12/1982 | Katzman et al. | 364/200 |
| 4,379,332 | 4/1983 | Busser et al. | 364/431.05 |
| 4,428,020 | 1/1984 | Blanchard, Jr. | 361/90 |

FOREIGN PATENT DOCUMENTS 2659043 6/1978 Fed. Rep. of Germany ........ 361/92

Primary Examiner—Patrick R. Salce
Attorney, Agent, or Firm—Edward P. Heller, III; Joseph A. Genovese

[57] ABSTRACT

A simplified power on/off protect circuit is provided to enable logic above a predetermined power supply voltage level and disable the logic below such predetermined voltage level. The circuit comprises a zener diode in combination with a transistor such that the zener controls the voltage level at which the transistor turns on. The transistor enables the logic.

2 Claims, 2 Drawing Figures

POWER ON/OFF PROTECT CIRCUIT

BACKGROUND OF THE INVENTION

The present invention relates generally to the field of power on/off circuits, and particularly to circuits for disabling the transmission of data during the period of time between power on and power off at which logic gates operate unreliably.

BRIEF DESCRIPTION OF THE PRIOR ART

It is a well-known phenomena of logic gates that at certain voltage levels their outputs are indeterminate (i.e., they may follow the power supply). In systems where parts of the systems have independently supplied power such that one part of the system may be in a powered on condition while another part of the system may be losing or gaining power, the result may be the loss of data. An example of such a system is a disk drive and an independently powered controller. If power is lost in the controller, the logic gates go through a condition where the outputs are indeterminate. This may cause incorrect data to be written or correct data on the disk to be overwritten or otherwise lost.

The phenomena has been recognized heretofore in multiprocessor systems. Logic enable/disable circuits coupled with a power on/off sensing circuit have been incorporated in such systems. See Katzman et al, U.S. Pat. No. 4,365,295, filed May 6, 1980, and assigned to Tandem Computers, Inc. of Cupertino, Calif., at FIG. 25 and the discussion in relation thereto at col. 40, line 25 through col. 43, line 16. The Katzman circuit essentially enables one or more transistors, such as transistor 216, when the voltage of power supply Vcc is too low. The transistor in turn pulls the enable line of a transmitter 200 (see FIG. 20) to ground through the transistors. However, the power supply must obtain a level sufficient to activate transistor 212, which then deactivates transistor 214 and activates transistor 216, before the enable line of transmitter 200 can be pulled to ground. The transmitter is a type 7438 logic gate as specified at col. 40, line 46. Katzman notes that when the enable line of this type of gate is held below two diode drops above ground potential, the transistor outputs of the 7438 are forced into the off state regardless of the level of power applied to the integrated circuit. Two diode drops, as known in the art, are between 1 and 1.4 volts. The specifications of the 7438 state that the enable must be equal or less than 0.8 volts. Thus, it is theoretically possible that the circuit shown in Katzman '295 may not in fact hold the 7438 in an off state at very low input voltage levels.

Additionally, comparison of applicant's circuit with that of Katzman '295 will illustrate that applicant's invention is considerably more efficient in terms of the use of components, and thus, is more reliable and less expensive than the Katzman circuit while performing essentially the same function.

SUMMARY OF THE INVENTION

The invention essentially comprises interposing one or more gates between separately powered devices of a system. The gates control the transmission of logic signals which must not operate at power levels at which logic gates are indeterminate. The gates have an enable input pulled to ground through a resistor. Additionally, the enable input is coupled to the collector of a transistor whose emitter is coupled to the power supply to be monitored. A Zener diode is also coupled to the power supply and to the base of the transistor. The Zener controls the voltage level at which transistor turns on. When the transistor turns on, the power supply is coupled through the resistor to ground, and the rising voltage level across the resistor enables the gates which thereby enable transmission the critical logic signals.

DESCRIPTION OF THE PREFERRED EMBODIMENT

Figure 1:
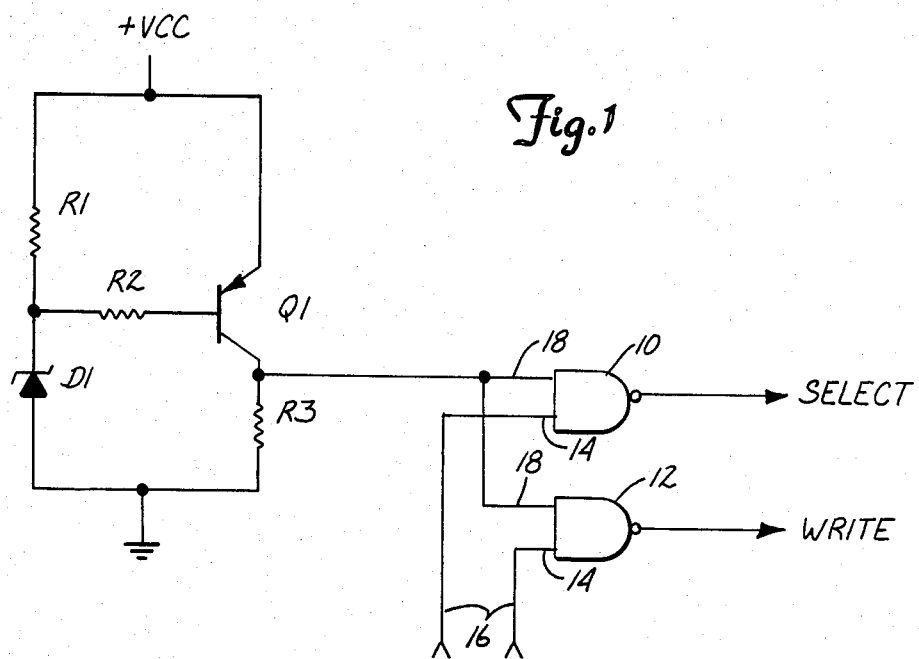
FIG. 1 shows a circuit diagram of the preferred embodiment of the invention.

FIG. 1 shows the invention as it would appear in a disk drive environment. A controller (not shown) controls disk drive functions and is separately powered from the disk drive (also not shown).

It is essential in this environment that if the power to the controller fails, the signals which select the disk drive and cause the disk drive to write data must be disabled prior to the voltage reaching a level at which the logic in the controller become indeterminate. Thus, in the Figure there are provided two gates, 10 and 12, which respectively control the select and the write signals to the disk drive. In the preferred embodiment, the gates are 7438's, available from the Texas Instruments Corp. One of the inputs 14 to the gates 10 and 12 are the corresponding signals 16 from the controller. The other inputs 18 to the gates are connected through a low impedance resistor R3 to ground. The connection of this input 18 to ground forces the gate output transistors into the "off" state. This condition will be maintained by the circuit of the present invention so long as the voltage of the power supply Vcc is at a level insufficient to permit logic gates to operate reliably.

The description of the other circuit elements will include a description of their operation in the circuit. First, assume that the power to the controller is off. Vcc in FIG. 1 will be at zero volts. When power comes on, Vcc will begin to rise; however, the voltage at the base and the emitter of transistor Q1, both connected to Vcc, the base through resistors R2 and R1, will remain equal and transistor Q1 will remain off. As Vcc continues to rise it will reach a voltage at which Zener diode D1, also connected to Vcc through resistor R1 and connected to ground, begins to conduct. This causes a voltage drop across resistor R1, thereby forward biasing the base/emitter junction of transistor Q1. Transistor Q1 then begins to turn "on." Current flows through resistor R2 in the base lead, through Zener diode D1 to ground. This current is amplified in transistor Q1, and the voltage across resistor R3 rises rapidly. When the voltage across R3 rises to above two diodes drops above ground, the gates 10 and 12 are enabled, thereby enabling the transmission of the select and write signals to the disk drive. The voltage level at which the Zener diode D1 begins to conduct its selected at a level which will assure that gates 10 and 12 are enabled at a power supply voltage sufficient to assure proper operation of the adapter logic.

When power is lost to the controller, Vcc falls. When the voltage drops below the Zener voltage of D1, Zener diode D1 ceases to conduct thereby causing transistor Q1 to turn "off". When transistor Q1 turns off, the voltage across R3 drops to near zero and gates 10 and 12 are disabled.

Figure 2:
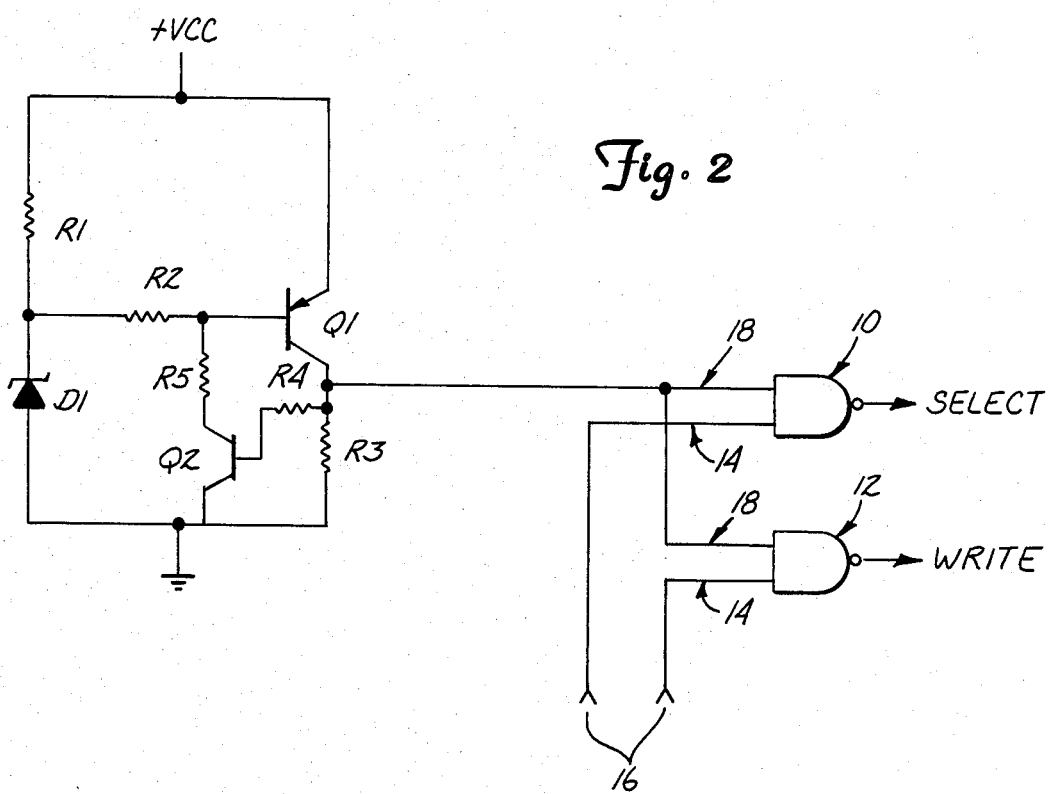
FIG. 2 shows a circuit diagram of a circuit according to the present invention with the addition of a hysteresis circuit.

FIG. 2 shows an alternative embodiment of the present invention which includes a hysteresis function to avoid "circuit" instability. Resistors R4, R5 and NPN transistor Q2 have been added. The emitter of transistor Q2 is connected to ground, its base is connected through R4 to the collector of PNP transistor Q1, and its collector is connected through resistor R5 to the base of transistor Q1.

Initially, when Vcc is low and Q1 is off, the base and emitter of Q2 are at the same voltage, both connected to ground (the base through resistors R4 and R3). Q2 is off and will remain off. When the Zener D1 begins to conduct, Q1 turns on, the voltage across R3 rises, and the base-emitter junction of Q2 is forward-biased, turning Q2 on. When Q2 turns on, it provides an additional path for current to the base of Q1, driving it to saturation quicker than with the circuit of FIG. 1.

When, Vcc falls due to power failure, at some point Zener D1 stops conducting. However, due to the voltage drop across R1, R2, R5 and Q2 to ground, the base of Q1, connected between R2 and R5 will remain at a lower voltage than the emitter of Q1, which is directly connected to Vcc. Thus, Q1 will remain on, and so will Q2. At some point though, the value of R1, R2 and R5 being adjusted to effect the same, the difference between the voltage at the base of Q1 and Vcc will fall to a value less than the intrinsic base-emitter voltage needed to forward bias Q1, and Q1 will turn off. That is, $$V_{cc} - V_b < V_{be-min}$$

where $V_b$ is the base voltage and $V_{be-min}$ is the minimum base-emitter voltage necessary to forward bias transistor Q1. When Q1 turns off, Q2 turns off. The turn-off time of Q1 is enhanced by the fact that as the voltage across R3 drops, the voltage across Q2 increases, increasing $V_b$ of Q2, accelerating the turn off of Q1.

This completes a description of the preferred embodiment. Specification of the elements of the preferred embodiment not be taken as a limitation on the scope of the attached claims in, Which I claim:

1. Power on/off protect circuit for enabling one or more logic gates when their power supply voltage is above a predetermined level at which the outputs of the logic gates are indeterminate and for disabling the gates before the voltage drops below said predetermined level, comprising:

one or more gates having outputs which are indeterminate when the gates power supply is below a first predetermined voltage level and whose output is off when at least one input is held below a second predetermined voltage above ground;

a set of inputs to said one or more gates connected through a low impedance resistor to ground;

a first transistor whose collector is connected to said set of inputs between said low impedance resistor and said gates;

a power supply whose voltage level is to be monitored connected to the emitter of said first transistor and to the base of said first transistor through one or more resistors;

a zener diode connected on one side to ground and on the other side to the base of said first transistor and to the the power supply between said power supply and one or more resistors; the zener diode adapted to conduct above a third predetermined voltage level, said predetermined third voltage level being at least a predetermined voltage drop level above a level sufficient to reliably operate logic gates;

a second transistor;

the base of said second transistor connected through a resistor to the collector of said first transistor;

the emitter of said second transistor connected to ground; and the collector of said second transistor connected to the base of said first transistor; whereby the second transistor operates to maintain the first transistor in a conducting state for said predetermined voltage drop after the zener diode has ceased to conduct in response to said power supply voltage dropping below said third predetermined voltage, after which said first transistor ceases to conduct and the voltage input to said logic gates falls below said second predetermined voltage level thereby disabling said logic gates.

2. The protect circuit of claim 1 further including a resistor connected between said zener diode and the base of said first transistor.

* * * * *